(12) United States Patent
Tsai et al.

(10) Patent No.: US 7,746,630 B2
(45) Date of Patent: Jun. 29, 2010

(54) COMPUTER ENCLOSURE FOR SECURING RISER CARD

(75) Inventors: Lung-Sheng Tsai, Taipei Hsien (TW); Ho-Chin Tsai, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 280 days.

(21) Appl. No.: 11/872,046

(22) Filed: Oct. 15, 2007

(65) Prior Publication Data

US 2009/0073645 A1  Mar. 19, 2009

(30) Foreign Application Priority Data

Sep. 6, 2007  (CN) .................. 2007 2 0200975 U

(51) Int. Cl.
*G06F 1/16* (2006.01)
*H05K 5/00* (2006.01)
*H05K 7/00* (2006.01)

(52) U.S. Cl. .............................. 361/679.32; 361/679.6; 361/752

(58) Field of Classification Search ............. 361/679.6, 361/752, 679.02, 679.31, 679.32, 679.4, 361/724
See application file for complete search history.

(56) References Cited

U.S. PATENT DOCUMENTS

| | | | | |
|---|---|---|---|---|
| 4,971,563 A | * | 11/1990 | Wells, III | 361/679.4 |
| 4,979,075 A | * | 12/1990 | Murphy | 361/679.6 |
| 5,440,755 A | * | 8/1995 | Harwer et al. | 710/315 |
| 5,594,621 A | * | 1/1997 | van Rumpt | 361/679.32 |
| 5,820,171 A | * | 10/1998 | Albani et al. | 361/679.6 |
| 5,831,821 A | * | 11/1998 | Scholder et al. | 361/679.58 |
| 5,835,346 A | * | 11/1998 | Albani et al. | 361/679.6 |
| 5,943,215 A | * | 8/1999 | Carney et al. | 361/752 |
| 5,963,431 A | * | 10/1999 | Stancil | 361/803 |
| 6,046,912 A | * | 4/2000 | Leman | 361/679.58 |
| 6,261,104 B1 | | 7/2001 | Leman | |
| 6,421,911 B1 | * | 7/2002 | Misner et al. | 361/752 |
| 6,618,260 B2 | * | 9/2003 | Willis et al. | 361/752 |
| 6,731,515 B2 | * | 5/2004 | Rhoads | 361/796 |
| 6,830,458 B2 | * | 12/2004 | Kobayashi et al. | 361/679.58 |
| 6,894,906 B2 | * | 5/2005 | Sivertsen | 361/752 |
| 6,913,470 B1 | * | 7/2005 | Lafleur | 361/679.32 |
| 7,123,470 B2 | * | 10/2006 | Hsu et al. | 361/679.02 |
| 7,227,745 B2 | * | 6/2007 | Kowalkowski et al. | 361/752 |
| 7,359,216 B2 | * | 4/2008 | Hall | 361/752 |
| 7,499,285 B2 | * | 3/2009 | Chen et al. | 361/752 |
| 7,525,815 B2 | * | 4/2009 | Chen et al. | 361/755 |
| 2004/0196624 A1 | * | 10/2004 | Kobayashi et al. | 361/683 |
| 2005/0122703 A1 | * | 6/2005 | Fan et al. | 361/801 |
| 2008/0253076 A1 | * | 10/2008 | Chen | 361/684 |

* cited by examiner

*Primary Examiner*—Jayprakash N Gandhi
*Assistant Examiner*—Adrian S Wilson
(74) *Attorney, Agent, or Firm*—Frank R. Niranjan

(57) ABSTRACT

A computer enclosure includes a bottom plate (12), a rear plate (14), and a mounting plate (60). The rear plate is perpendicular to the bottom plate for securing an expansion card (100) thereon. The mounting plate is perpendicularly secured on the bottom plate for securing a riser card (80) thereon, and perpendicular to the rear plate. A receiving structure (66) is defined in the mounting plate for a socket (88) formed on the riser card inserting therethrough to electronically receive a part of the expansion card.

17 Claims, 6 Drawing Sheets

COMPUTER ENCLOSURE FOR SECURING RISER CARD

BACKGROUND

1. Technical Field

The present invention relates to computer enclosures, and more particularly to a computer enclosure for securing a riser card therein.

2. General Background

In order to enhance functions of a computer system, a plurality of expansion cards is installed in the computer system. The expansion cards are usually inserted in sockets of a motherboard installed in a chassis of the computer system. Because each of the sockets of the motherboard can only receive one of the expansion cards, the number of expansion cards is determined by the number of sockets on the motherboard.

In order to increase the number of expansion cards installed in the chassis of the computer system, a riser card is provided to electronically connect with one of the sockets of the motherboard. A plurality of sockets is formed on a surface of the riser card for receiving the expansion cards. The riser card is usually secured to a surface of a mounting plate of the chassis. After assembly, an opposite surface of the riser card is adjacent to and shielded by the mounting plate, so the riser card and the expansion cards can be only secured on one side of the mounting plate. Because the expansion cards cannot be secured on the opposite side of the mounting plate, space in the chassis at the opposite side of the mounting plate is wasted.

What is needed, therefore, is a computer enclosure capable of efficiently using an inner space thereof.

SUMMARY

A computer enclosure includes a bottom plate, a rear plate, and a mounting plate. The rear plate is perpendicular to the bottom plate for securing an expansion card thereon. The mounting plate is perpendicularly secured on the bottom plate for securing a riser card thereon, and perpendicular to the rear plate. A receiving structure is defined in the mounting plate for a socket formed on the riser card inserting therethrough to electronically receive a part of the expansion card.

Other advantages and novel features will be drawn from the following detailed description of embodiments with attached drawings, in which:

DETAILED DESCRIPTION

Figure 1:
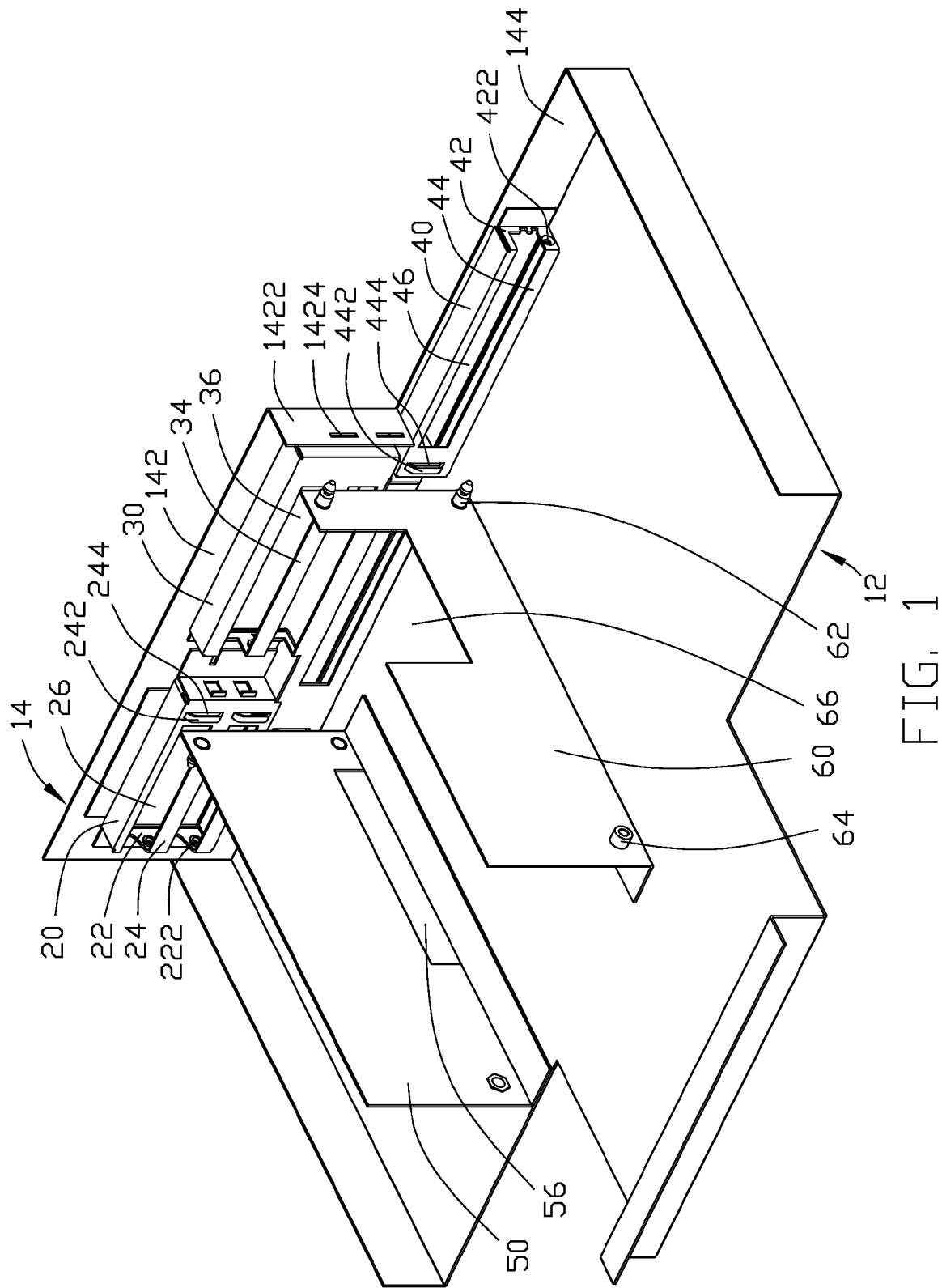
FIG. 1 is an isometric, partial view of a computer enclosure of a preferred embodiment of the present invention.
Figure 2:
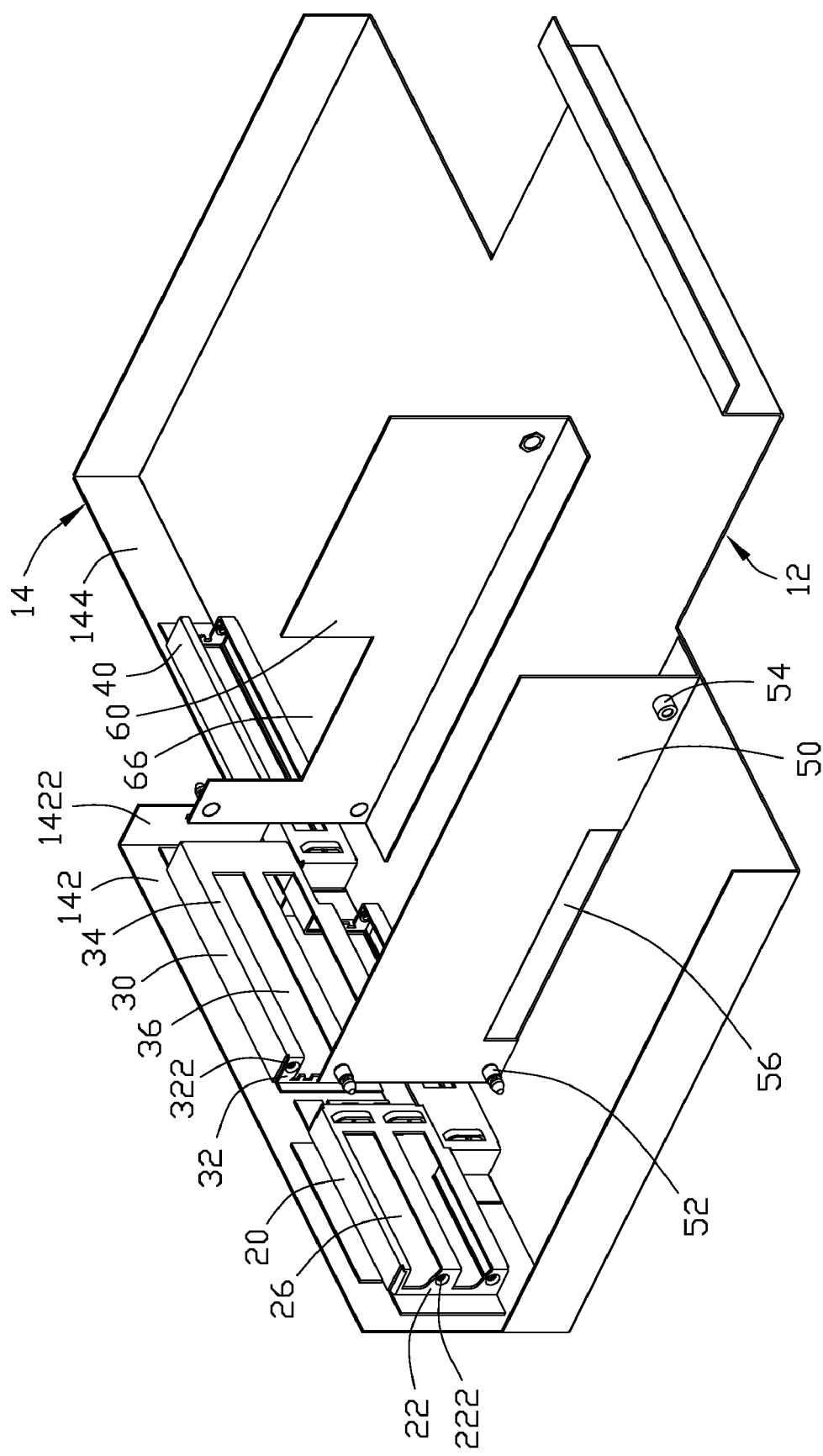
FIG. 2 is similar to FIG. 1, but viewed from another aspect.

Referring to FIG. 1, a computer enclosure of an embodiment of the present invention includes a bottom plate 12, and a rear plate 14 perpendicular to the bottom plate 12. The rear plate 14 includes a first installing portion 142, and a second installing portion 144 having a height less than that of the first installing portion 142. A bent flange 1422 is perpendicularly bent in from an edge of the first installing portion 142, which is perpendicular to the bottom plate 12 and positioned above the second installing portion 144. Two aligned slits 1424 are defined in the bent flange 1422 adjacent a front edge thereof, and are perpendicular to the bottom plate 12.

A first bracket 20 and a second bracket 30 are secured on an inner surface of the first installing portion 142 of the rear plate 14, and the second bracket 30 is positioned between the first bracket 20 and the bent flange 1422 of the rear plate 14. The first bracket 20 includes a mounting portion 22 parallel to the bent flange 1422 and away from the second bracket 30, and a positioning portion 24 perpendicular to the mounting portion 22. Two through openings 26 are defined in the combined structure of the mounting portion 22 and the positioning portion 24, and extend in a direction parallel to the bottom plate 12. Two mounting holes 222 are respectively defined below the through openings 26 in the mounting portion 22. Two strips 242 protrude inward from the positioning portion 24 respectively at one side of each through opening 26. A slit 244 is thereby defined between each strip 242 and the positioning portion 24. The second bracket 30 includes a mounting portion 32 parallel to the bent flange 1422 and adjacent the first bracket 20, and a positioning portion 34 perpendicular to the mounting portion 32. Two through openings 36 are defined in the combined structure of the mounting portion 32 and the positioning portion 34, and extend in a direction parallel to the bottom plate 12, respectively corresponding to the slits 1424 of the bent flange 1422. Two mounting holes 322 are respectively defined above the openings 36 in the mounting portion 32.

A third bracket 20 is secured on an inner surface of the second installing portion 144. The third bracket 40 includes a mounting portion 42 parallel to the bent flange 1422 and away from the second bracket 30, and a positioning portion 44 perpendicular to the mounting portion 42. A through opening 46 is defined in the combined structure of the mounting portion 42 and the positioning portion 44, and extends in a direction parallel to the bottom plate 12. Two mounting holes 422 are respectively defined below the through openings 46 in the mounting portion 42. A strip 442 protrudes in from the positioning portion 44 at one side of the through opening 46, adjacent the bent flange 1422 of the rear plate 14. A slit 444 is thereby defined between the strip 442 and the positioning portion 44.

First and second parallel mounting plates 50, 60 are perpendicularly secured on the bottom plate 12. The first mounting plate 50 is generally positioned between the first bracket 20 and the second bracket 30, and the second mounting plate 60 is generally positioned between the second bracket 20 and the third bracket 40. Two locking posts 52 and a securing post 54 with a hole defined therein are respectively formed on three corners of a surface of the mounting plate 50, which is adjacent to the first bracket 20. A receiving structure, such as a through opening 56, is defined in the first mounting plate 50, adjacent the bottom plate 12. Two locking posts 62 and a securing post 64 with a hole defined therein are respectively formed on three corners of a surface of the second mounting plate 60, which is adjacent to the third bracket 40. A receiving structure, such as a cutout 66, is defined in a top edge of the second mounting plate 60.

Figure 3:
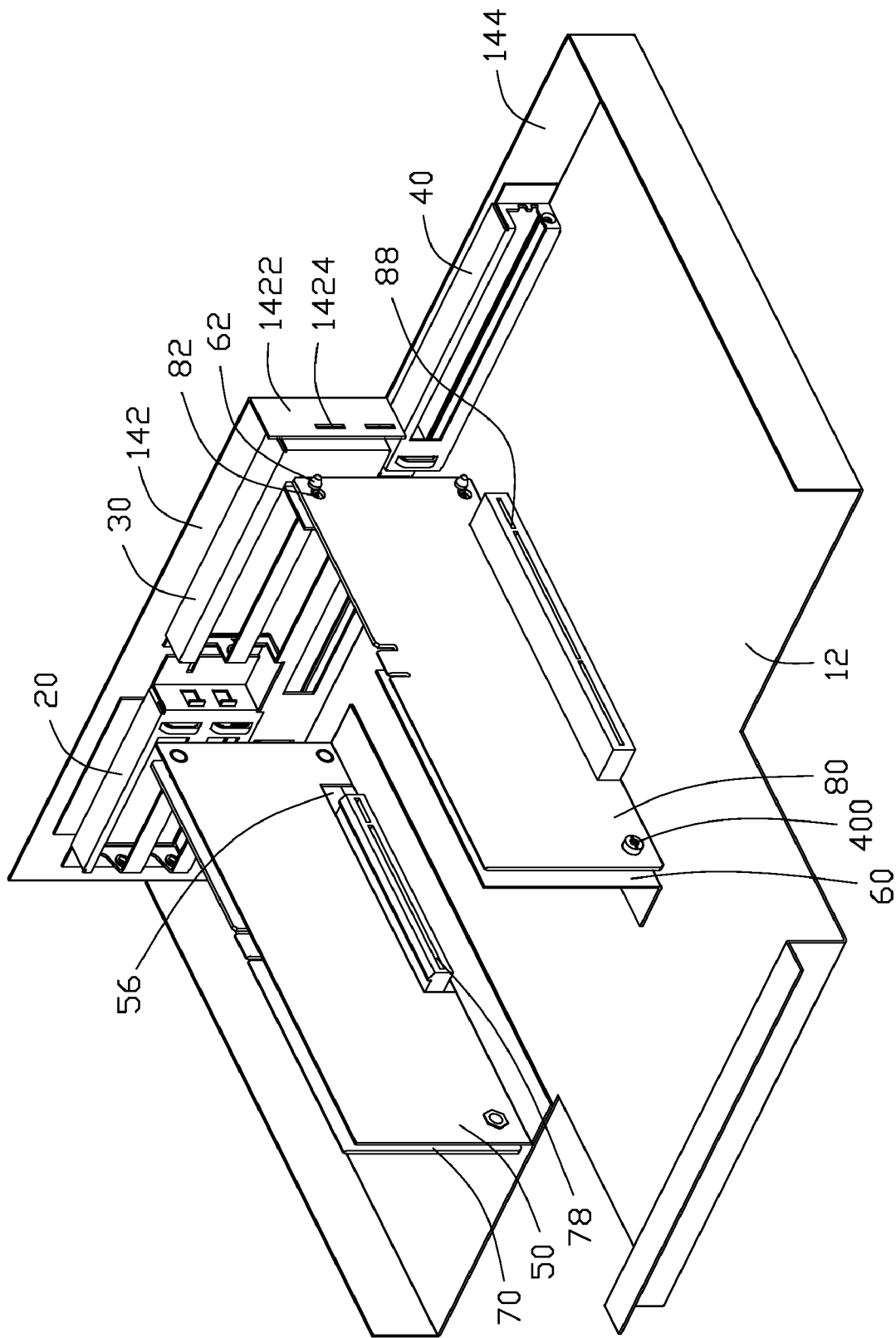
FIG. 3 is an assembled view of the computer enclosure of FIG. 1 with two riser cards.
Figure 4:
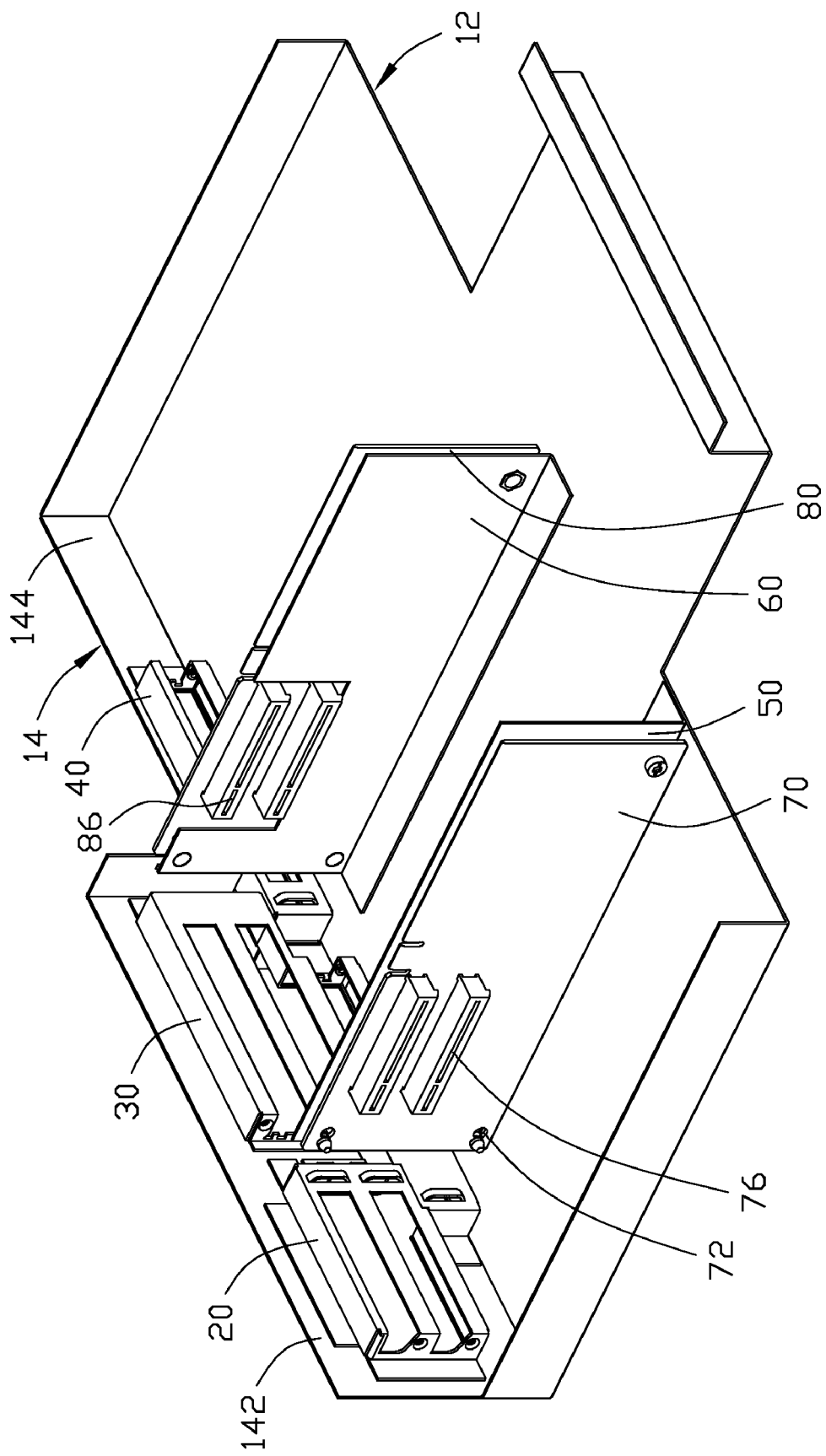
FIG. 4 is similar to FIG. 3, but viewed from another aspect.

Referring also to FIGS. 3-4, first and second riser cards 70, 80 are respectively secured on the first and second mounting plates 50, 60. The first riser card 70 has a first surface, and a second surface opposite to the first surface and facing the second mounting plate 60. Two first expansion sockets 76 are formed on the first surface, and a second expansion socket 78 is formed on the second surface corresponding to the through opening 56. Two generally key-shaped locking holes 72 and a through hole (not labeled) are respectively defined in three corners of the first riser card 70, corresponding to the locking posts 52 and the securing post 54 of the first mounting plate 50. The second riser card 70 has a first surface facing the first mounting plate 50, and a second surface opposite to the first surface. Two first expansion sockets 86 are formed on the first surface corresponding to the cutout 66 of the second mounting plate 60, and a second expansion socket 88 is formed on the second surface. Two generally key-shaped locking holes 82 and a through hole (not labeled) are respectively defined in three corners of the second riser card 80, corresponding to the locking posts 62 and the securing post 64 of the second mounting plate 60.

Figure 5:
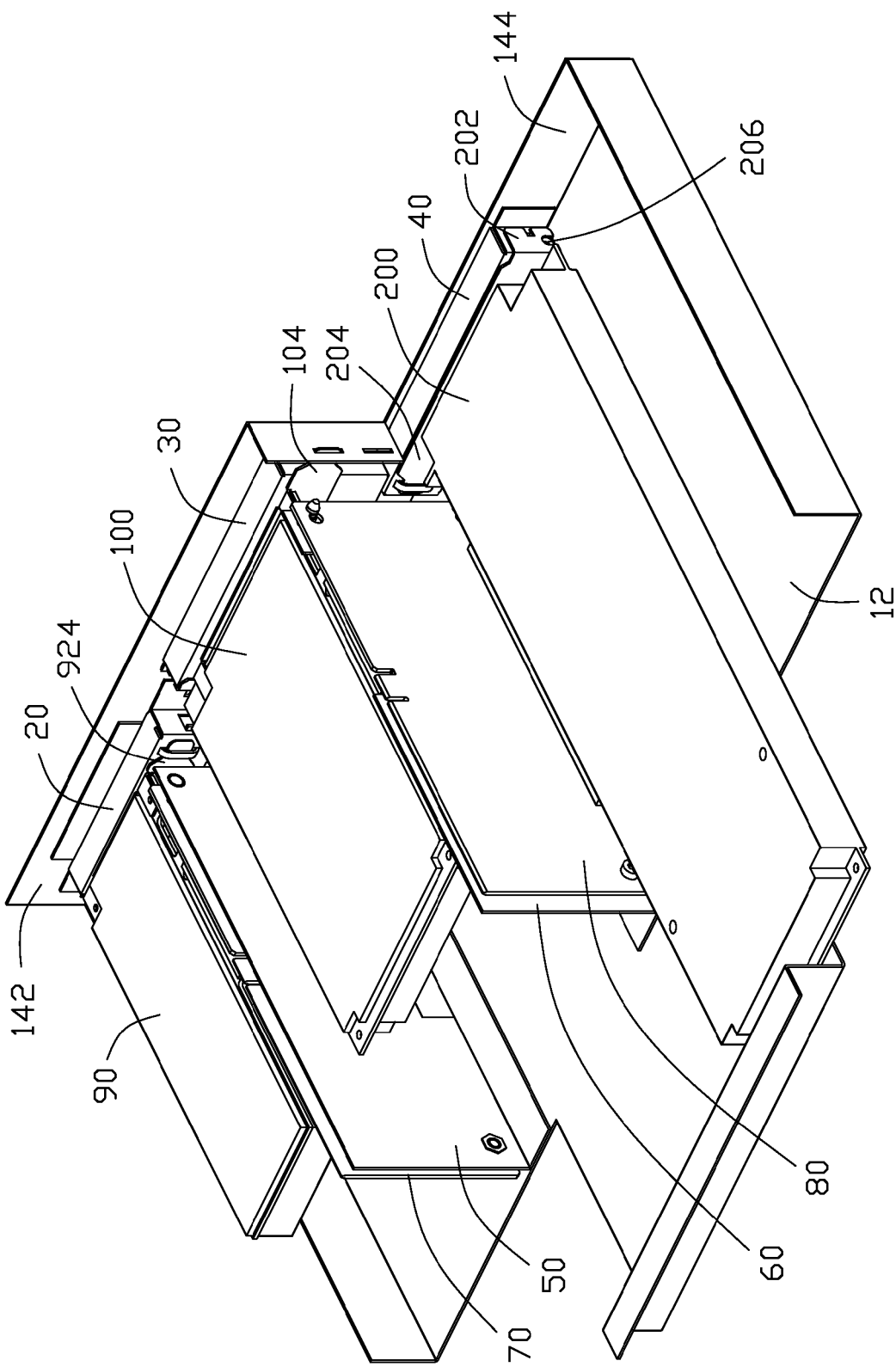
FIG. 5 is an assembled view of the computer enclosure of FIG. 1, the two riser cards, and three expansion cards.
Figure 6:
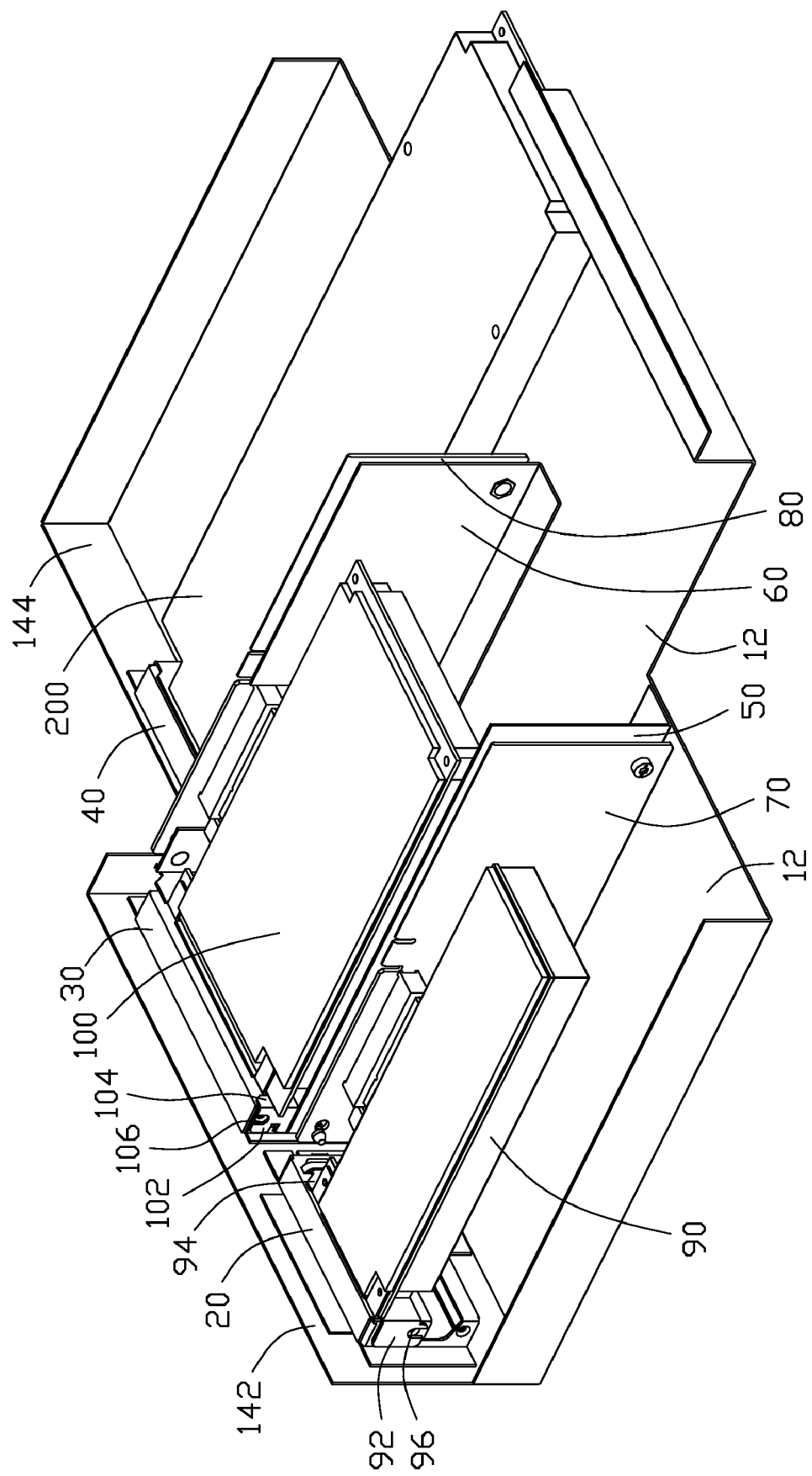
FIG. 6 is similar to FIG. 5, but viewed from another aspect.

Referring to FIGS. 5-6, first, second, and third expansion cards 90, 100, and 200 can be respectively secured on the first, second and third brackets 20, 30, and 40. The first expansion card 90 includes a part capable of inserting in the socket 76 for electronically connecting with the first riser card 70, and an L-shaped shielding plate (not labeled) capable of being secured on the first bracket 20 for covering the through opening 26 of the first bracket 20. The shielding plate includes a latch portion 92 and a positioning portion 94 perpendicular to the latch portion 92. A cutout 96 is defined in the latch portion 92 corresponding to the mounting hole 222 of the mounting portion 22 of the first bracket 20.

The second expansion card 100 includes a part capable of inserting in the socket 86 for electronically connecting with the second riser card 80, and an L-shaped shielding plate (not labeled) capable of being secured on the second bracket 30 for covering the through opening 36 thereof. The shielding plate includes a latch portion 102 and a positioning portion 104 perpendicular to the latch portion 102. A cutout 106 is defined in the latch portion 102 corresponding to the mounting hole 322 of the mounting portion 32 of the second bracket 30.

The third expansion card 200 includes a part capable of inserting in the socket 86 of the second riser card 80 for electronically connecting with the second riser card 80, and an L-shaped shielding plate (not labeled) capable of being secured on the third bracket 40 for covering the through opening 46 thereof. The shielding plate includes a latch portion 202 and a positioning portion 204 perpendicular to the latch portion 202. A cutout 206 is defined in the latch portion 202 corresponding to the mounting hole 422 of the mounting portion 42 of the third bracket 40.

Because processes of securing the second riser card 80, and third expansion card 200 are similar to that of securing the first riser card 70, and the first and second expansion cards 90, 100, only assembly of the second riser card 80 and the third expansion card 200 is described herein.

Referring also to FIGS. 3-4, in securing the second riser card 80, the sockets 86 of the second riser card 80 are inserted through the cutout 66 of the second mounting plate 60. The locking posts 62 of the second mounting plate 60 are respectively inserted and locked into the locking holes 82 of the second riser card 80 in order to prevent the second card 80 moving away from the second mounting plate 60 in a direction perpendicular to the second mounting plate 60. At this time, the through hole of the second riser card 80 aligns with the hole of the securing post 64 of the second mounting plate 60. A locking member 400, such as a screw, is inserted through the through hole of the second riser card 80 and screwed into the hole of the securing post 64 of second mounting plate 60. Thus, the second riser card 80 is stably secured on the second mounting plate 60.

Referring also to FIGS. 5-6, in securing the third expansion card 200, an end of the positioning portion 204 of the shielding plate and the part of the third expansion card 200 are respectively inserted into the slit 444 of the third bracket 40 and the socket 88 of the second riser card 80. The latch portion 202 and the positioning portion 204 respectively abut on mounting portion 42 and the positioning portion 44 of the third bracket 40. The cutout 206 of the latch portion 204 of the third expansion card 200 aligns with the mounting hole 422 of the mounting portion 42 of the third bracket 40. A mounting member (not shown) is secured into the cutout 206 of the shielding plate and the mounting hole 422 of the third bracket 40, so as to stably fasten the expansion card 200 on the third bracket 40.

In this embodiment of the present invention, after assembly, the locking posts 52 of the first mounting plate 50 are locked into the corresponding locking holes 72 of the first riser card 70. A locking member (not labeled) is screwed into the through hole of the first riser card 70 and the hole of the securing post 54 of the first mounting plate 50 to stably secure the first riser card 70 on the first mounting plate 50. The socket 78 of the first riser card 70 is inserted through the through opening 56 of the first mounting plate 50, so as to receive a part of another expansion card (not shown) therein. An end of the positioning portion 94 of the shielding plate of the first expansion card 70 is inserted into the slit 244 of the first bracket 20, and a screw (not shown) is screwed into the cutout 96 of the shielding plate of the first expansion card 90 and the mounting hole 222 of the first bracket 20. An end of the positioning portion 104 of the shielding plate of the second expansion card 100 is inserted into the slit 1424 of the bent flange 1422 of the rear plate 14, and a screw (not shown) is screwed into the cutout 206 of the shielding plate of the second expansion card 100 and the mounting hole 322 of the second bracket 30.

In this embodiment, the first riser card 70 is capable of securing the first expansion card 70 at one side of the first mounting plate 50, and the another expansion card (not shown) at an opposite side of the first mounting plate 50. The second and third expansion cards 100, 200 are respectively positioned at opposite sides of the second mounting plate 60. Therefore, space in the computer enclosure at both sides of the first and second mounting plates 50, 60 can be efficiently used.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a bottom plate;
   a rear plate perpendicular to the bottom plate;
   at least two brackets secured on the rear plate, each bracket securing at least one expansion card; and
   a mounting plate perpendicularly secured on the bottom plate for securing a riser card thereon, and perpendicular to the rear plate, the mounting plate located on the bottom plate at a position between two of the at least two brackets, an opening defined in the mounting plate for a socket formed on the riser card inserting therethrough to electronically receive a part of the expansion card, so that the riser card is capable of coupling to the expansion cards on the at least two brackets, wherein the riser card is mounted parallel to the mounting plate and the riser card is connected to one of the expansion cards through the opening in the mounting plate.

2. The computer enclosure as described in claim 1, wherein the receiving structure is a through opening defined in the mounting plate.

3. The computer enclosure as described in claim 1, wherein the receiving structure is a cutout defined in the mounting plate.

4. The computer enclosure as described in claim 1, wherein a bent flange is perpendicularly formed on the rear plate, and perpendicular to the bottom plate.

5. The computer enclosure as described in claim 4, wherein the bent flange defines a slit therein for receiving an end of a shielding plate secured on the expansion card.

6. The computer enclosure as described in claim 1, wherein each bracket comprises a mounting portion parallel to the bent flange and a positioning portion perpendicular to the mounting portion, the bracket defining a slot in the mounting portion and the positioning portion and extending a direction parallel to bottom plate for the shielding plate of the expansion card covering thereon when the end of the shielding plate inserts into the slit of the bent flange of the rear plate.

7. A computer enclosure comprising:
a bottom plate;
a rear plate perpendicularly formed on the bottom plate;
at least two brackets secured on the rear plate, each bracket securing at least one expansion card having a shielding plate; a bent flange perpendicularly bent from the rear plate at a side adjacent to one of the brackets and perpendicular to the bottom plate, the bent flange defining at least one slit therein for receiving an end of the shielding plate therein; and
a mounting plate perpendicularly secured on the bottom plate between the two brackets for securing a riser card, wherein the riser card is mounted parallel to the mounting plate, the mounting plate comprising an opening and the riser card is connected to both of the expansion cards, the riser card being connected to one of the expansion cards through the opening.

8. The computer enclosure as described in claim 7, wherein a receiving structure is formed on the mounting bracket for the socket of the riser card inserting therethrough to receive the part of the first expansion card.

9. The computer enclosure as described in claim 8, wherein the receiving structure is a through opening defined in the mounting plate.

10. The computer enclosure as described in claim 8, wherein the receiving structure is a cutout defined in the mounting plate.

11. The computer enclosure as described in claim 7, wherein each bracket comprises a mounting portion parallel to the bent flange and a positioning portion perpendicular to the mounting portion, the bracket defining a slot in the mounting portion and the positioning portion and extending in a direction parallel to bottom plate for the shielding plate of the expansion card covering thereon.

12. A computer comprising:
a bottom plate;
a rear plate perpendicular to the bottom plate;
at least two brackets arranged on the rear plate, each bracket securing at least one expansion card;
a mounting plate perpendicular to the bottom plate and the rear plate, and located between two of the at least two brackets, the mounting plate defining an opening; and
a riser card parallel to the mounting plate, the riser card having a first surface and a second surface opposite to the first surface, the first surface and the second surface each arranging at least one socket thereon, one socket on the first surface and the second surface of the riser card extending through the opening in the mounting plate so that the riser card is capable of coupling to the expansion cards on the at least two brackets.

13. The computer as described in claim 12, wherein the mounting plate defines a cutout therein for the socket of the riser card extending therethrough.

14. The computer as described in claim 12, wherein the mounting plate defines a through opening therein for the socket of the riser card extending therethrough.

15. The computer as described in claim 12, wherein a bent flange is perpendicularly bent from the rear plate, and perpendicular to the bottom plate.

16. The computer as described in claim 15, wherein the bent flange defines a slit therein for receiving an end of the shielding plate of the expansion card.

17. The computer as described in claim 16, wherein each bracket comprises a mounting portion parallel to the bent flange and the positioning portion perpendicular to the mounting portion, the bracket defining a slot in the mounting portion and the positioning portion and extending a direction parallel to bottom plate for the shielding plate of the expansion card covering thereon when the end of the shielding plate inserts into the slit of the bent flange of the rear plate.

* * * * *